United States Patent
Müller

(12) 
(10) Patent No.: US 12,539,962 B2
(45) Date of Patent: Feb. 3, 2026

(54) AERIAL VEHICLE

(71) Applicant: Voliro AG, Zurich ETH-Zentrum (CH)

(72) Inventor: Timo Müller, Zürich (CH)

(73) Assignee: Voliro AG, Zurich ETH-Zentrum (CH)

( * ) Notice: Subject to any disclaimer, the term of this patent is extended or adjusted under 35 U.S.C. 154(b) by 159 days.

(21) Appl. No.: 17/428,744

(22) PCT Filed: Feb. 4, 2020

(86) PCT No.: PCT/IB2020/050857
§ 371 (c)(1),
(2) Date: Aug. 5, 2021

(87) PCT Pub. No.: WO2020/161607
PCT Pub. Date: Aug. 13, 2020

(65) Prior Publication Data
US 2022/0106039 A1    Apr. 7, 2022

(30) Foreign Application Priority Data
Feb. 5, 2019    (CH) .................................. 00131/19

(51) Int. Cl.
*B64C 39/02*    (2023.01)
*B64C 27/32*    (2006.01)
(Continued)

(52) U.S. Cl.
CPC .......... *B64C 29/0033* (2013.01); *B64C 27/32* (2013.01); *B64U 10/14* (2023.01);
(Continued)

(58) Field of Classification Search
CPC ... B64C 39/024; B64C 27/32; B64C 29/0033; B64C 27/28; B64C 2027/8236;
(Continued)

(56) References Cited

U.S. PATENT DOCUMENTS 2,487,020 A * 11/1949 Gilerease ................ B64C 27/10
244/17.11
3,179,353 A * 4/1965 Peterson ............. B64C 29/0025
244/12.3
(Continued)

FOREIGN PATENT DOCUMENTS

CN    105539829 A    5/2016
CN    107639984 A    1/2018
(Continued)

OTHER PUBLICATIONS

International Search Report for PCT/IB2020/050857 dated Mar. 27, 2020.
Written Opinion for PCT/IB2020/050857 dated Mar. 27, 2020.

*Primary Examiner* — Christopher D Hutchens
(74) *Attorney, Agent, or Firm* — McDonald Hopkins LLC

(57) ABSTRACT

An aerial vehicle including: a central frame, a tail extending from the central frame along a first axis, arms extending from the central frame and able to rotate around a second axis, the angular position of the arm with respect to the second axis defining an arm rotation angle. The tail has a tail rotor spinning around a tail rotor axis, the tail rotor axis being parallel to a third axis orthogonal to both first axis and second axis. The free end of each arm is equipped with two thrust motors controlling spinning in opposite direction of two coaxial rotors. The two coaxial rotors define a double rotor axis and can tilt together with respect to another tilting axis, the tilting axis being perpendicular to the second axis, the angular position of the double rotor with respect to the double rotor axis defining a double rotor tilting angle.

24 Claims, 9 Drawing Sheets

(51) Int. Cl.
  *B64C 29/00* (2006.01)
  *B64U 10/14* (2023.01)
  *B64U 30/24* (2023.01)
  *B64U 50/13* (2023.01)
  *B64U 50/19* (2023.01)
  *B64U 101/29* (2023.01)

(52) U.S. Cl.
  CPC ............ *B64U 30/24* (2023.01); *B64U 50/13* (2023.01); *B64U 50/19* (2023.01); *B64U 2101/29* (2023.01)

(58) Field of Classification Search
  CPC ............ B64C 2027/8218; B64D 27/24; B64U 10/13; B64U 30/20; B64U 50/19; B64U 30/297
  See application file for complete search history.

(56) References Cited

U.S. PATENT DOCUMENTS

| | | | |
|---|---|---|---|
| 6,719,244 B1 * | 4/2004 | Gress | B64C 29/0033 244/7 R |
| 9,611,038 B2 | 4/2017 | Dahlstrom | |
| 10,399,676 B2 | 9/2019 | Dahlstrom | |
| 10,558,225 B2 * | 2/2020 | Cowley | G05D 1/0676 |
| 10,562,623 B1 * | 2/2020 | Sloan | B64D 31/06 |
| 11,167,847 B2 | 11/2021 | Dahlstrom | |
| 11,235,890 B1 | 2/2022 | Dahlstrom et al. | |
| 11,993,370 B2 * | 5/2024 | Wu | B64C 39/024 |
| 2006/0226281 A1 * | 10/2006 | Walton | B64C 27/20 244/17.23 |
| 2012/0091257 A1 * | 4/2012 | Wolff | B64C 39/024 244/12.4 |
| 2012/0298789 A1 * | 11/2012 | Oz | B64C 15/12 244/12.4 |
| 2013/0105620 A1 | 5/2013 | Abde Qader Alzu'bi et al. | |
| 2016/0325829 A1 | 11/2016 | Ahn et al. | |
| 2017/0003690 A1 * | 1/2017 | Tanahashi | G05D 1/102 |
| 2017/0233069 A1 * | 8/2017 | Apkarian | B64F 5/10 244/7 R |
| 2017/0369162 A1 | 12/2017 | Alzahrani | |
| 2018/0057157 A1 * | 3/2018 | Groninga | B64C 27/52 |
| 2018/0148169 A1 | 5/2018 | Zhang et al. | |
| 2018/0297695 A1 * | 10/2018 | Ramirez-Serrano | B64C 27/82 |
| 2018/0346112 A1 * | 12/2018 | Chiang | B64C 29/0033 |
| 2019/0047692 A1 * | 2/2019 | Schank | B64C 29/0033 |
| 2020/0062386 A1 * | 2/2020 | Zhang | B64C 27/28 |
| 2020/0172236 A1 * | 6/2020 | George | B64U 50/11 |
| 2020/0180761 A1 * | 6/2020 | Sloan | B64U 30/10 |
| 2020/0285251 A1 * | 9/2020 | Anishchenko | G01N 1/24 |

FOREIGN PATENT DOCUMENTS

| | | | | |
|---|---|---|---|---|
| CN | 207191416 U | 4/2018 | | |
| KR | 20170114097 A | 10/2017 | | |
| WO | 2018106137 A2 | 6/2018 | | |
| WO | WO-2019079930 A1 * | 5/2019 | | B60F 5/02 |

* cited by examiner

AERIAL VEHICLE

The present invention concerns an aerial vehicle, and in particular an unmanned aerial vehicle (UAV), and in particular a Micro Aerial Vehicle (MAVs) commonly known as a drone, which is an aircraft without a human pilot aboard.

While they originated mostly in military applications, the use of unmanned aerial vehicle has rapidly expanded to commercial, scientific, recreational, agricultural, and other applications, such as for instance policing, peacekeeping, and surveillance, but also product deliveries, aerial photography, agriculture, and drone racing.

Also, in the recent times, have been developed omnidirectional drones for physical interaction. A normal drone will need to be tilted to exert forces on the environment the environment, which is an unstable configuration. A small wind gust or any disturbance could rapidly lead to a crash of a normal drone. Therefore, current use for MAVs is most of the time limited to remote sensing tasks.

The main problem lies in the fact that currently existing MAVs cannot be robustly controlled when in physical contact with the environment. In recent years, fully actuated MAVs have started to gain attention as promising platforms for reliable aerial physical interaction. Equipped with an aerial manipulator, these platforms have the potential to achieve a high degree of versatility, robustness and stability.

Notably, there is a need not yet correctly fulfilled for omnidirectional drones or omnidirectional aerial vehicles that can interact with the environment, including applying force, while also staying in a stable position. Such type of omnidirectional aerial vehicles could be used for instance to do inspections of infrastructures, or to do painting or cleaning on high-rise buildings or any other difficult to reach places. Physical interaction with drones would be also useful for many other applications, notably industrial applications, such as non-destructive testing of bridges, tunnels, silos, or pipes, or other concrete structures, also for inspection of storage tanks or cavities that can further more be implemented by the human being remotely from the inspection site.

DESCRIPTION OF RELATED ART

Document US2018120196A1 presents a non-destructive inspection ("NDI") system that includes an unmanned aerial vehicle ("UAV") comprising a body structure. The body structure comprises one or more support structures with a releasable end structure; and one or more non-destructive inspection sensors integrated to a respective releasable end structure. This system also includes a location tracking system. A manipulator arm that can comprises a gripper allows implementation of specific tasks. The propulsion system is not detailed.

Document US2017015412A1 concerns a rotor-based remote flying vehicle platform which comprises a central frame with a control center that is configured to control motors mounted to the vehicle platform. Four arms are connected to the central frame and extend outward. A unique motor is mounted on the distal end of each arm and is controlled by a tilt actuator capable of tilting the motor according to different configurations. This configuration becomes highly inefficient when interacting with environment.

Document ES2614994 relates to an aircraft with a stationary flight capability comprising a contact device. More precisely, in this arrangement, there is a central section to which are attached two segments rigidly joined to each other, with a counterweight and a gripper. For propulsion, eight engines are used, equipped with propellers that are fixedly mounted with a predetermined inclination at an angle of between 0° and 45° on the horizontal plane. This configuration requires additional actuators to orient an end-effector in any orientation because it cannot tilt its body completely. Furthermore, it is not agile in changing the applied force and moment and requires a high thrust to weight ratio for stable control.

Document US2016325829 concerns a multi-rotor type unmanned aerial vehicle includes: a main body including the battery module and the control module; a plurality of frames (four main frames and four auxiliary frames) connected to a side surface of the main body and extending therefrom; a first motor connected to a distal end of each of the frames; and a drive unit connected to the first motor, wherein the drive unit includes a rotary frame and a stationary frame each having a circular shape and connected to each other in the form of a gyroscope, a second motor supported at the center of the rotatable frame, and a propeller connected to the second motor, and a vector of thrust generated by rotation of the propeller is variable according to rotation of the first and second motors. This arrangement having a lot of motors to be controlled, the driving of this aerial vehicle is quite complex and sensitive.

Document US2013105620 presents a system including a first coaxial rotor spaced from an aircraft body and a second coaxial rotor spaced from the aircraft body and opposite the first coaxial rotor; the first coaxial rotor having a first top propeller aligned with a first bottom propeller along a first rotational axis; the second coaxial rotor having a second top propeller aligned with a second bottom propeller along a second rotational axis. A gyroscopic moment to maintain pitch stability is controlled by modulating the first and second top propellers having a different angular speed or different torque from the first and second bottom propellers and tilting the first and second coaxial rotors towards the central axis with a common tilt angle and a common tilt rate.

One of the main problems lies in the unstable dynamics of aerial vehicles in contact with the environment and equipped with tools and sensors so as to perform as robots, which complicates the control performance.

In view of above considerations, there exist a need to propose an aerial vehicle that overcomes at least some of the drawbacks of the existing aerial vehicles.

There also exists a need to propose an improved aerial vehicle with respect of the existing aerial vehicles.

Also, some embodiments of the present invention aims to provide an aerial vehicle with advanced manipulation capabilities that can be employed in various tasks that require interaction with the environment, such as contact-based inspection, cleaning and lightweight maintenance.

BRIEF SUMMARY OF THE INVENTION

According to the invention, these aims are achieved by means of an aerial vehicle comprising:
- a central frame
- a tail extending from the central frame along a first axis (X),
- at least two arms extending from the central frame and able to rotate around at least one second axis (Y), the angular position of the arm with respect to the second axis (Y) defining an arm rotation angle (A1), wherein said tail is equipped with a tail rotor spinning around a tail rotor axis, said tail rotor axis being parallel to a third (Z) axis which is orthogonal to both first axis (X) and second axis (Y), wherein each arm is equipped with two thrust motors controlling the spinning in opposite direction of two coaxial rotors, and wherein the two coaxial rotors define a double rotor axis and can tilt together with respect to another tilting axis, said tilting axis being perpendicular to the second axis, the angular position of the double rotor with respect to the double rotor axis defining a double rotor tilting angle.

The proposed aerial vehicle is able to exert forces and torques in all directions with high capability of the system to control position and orientation independently. It means the aerial vehicle can take any orientation (including for instance, level position, vertical position or inclined position of the central frame of the aerial vehicle), and stay stabilised in that orientation, with the possibility of moving in that orientation and have possibly contact with a surface, with or without exerting a force on that surface.

Therefore, the proposed aerial vehicle is capable for physical interaction with environment, including for instance contact-based inspection.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
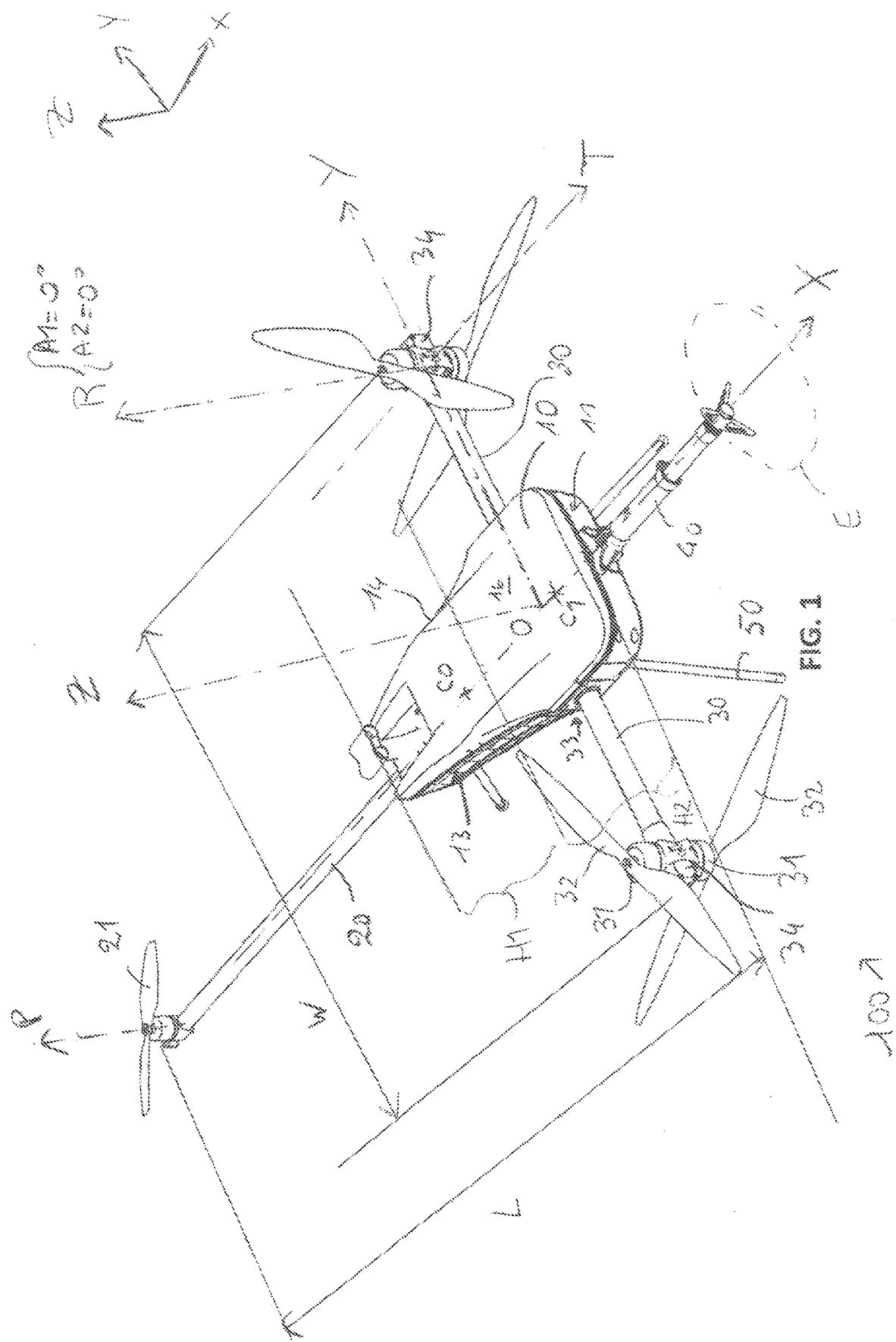
FIG. 1 shows a perspective view of an embodiment of an aerial vehicle according to the present invention, with the arm rotation angle and the double rotor tilting angle at 0°, that can be an initial or a reference position for the aerial vehicle.
Figure 2:
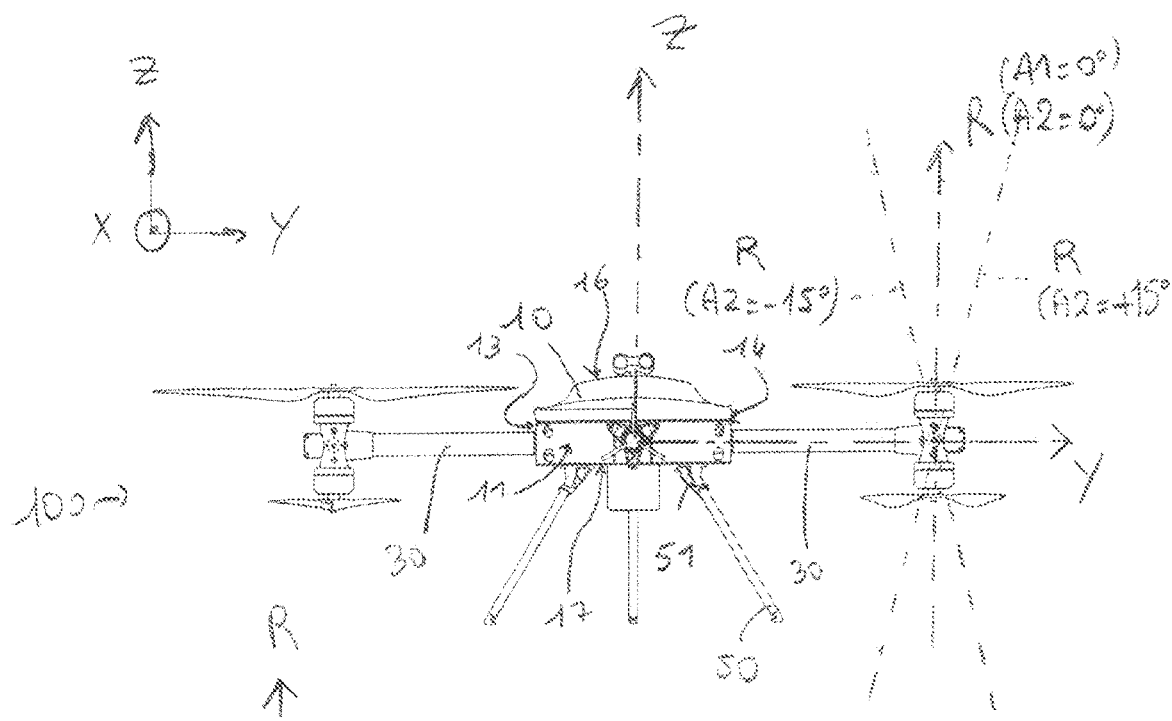
FIG. 2 shows a projection view of the aerial vehicle in the reference position of FIG. 1, from the front, namely from ahead the front face of the central frame.
Figure 3:
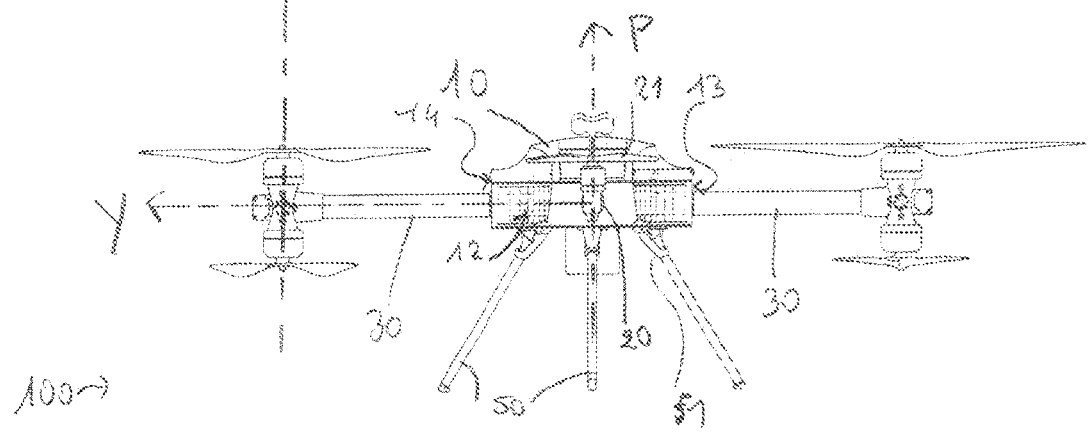
FIG. 3 shows a projection view of the aerial vehicle in the reference position of FIG. 1, from the rear, namely from behind the tail.
Figure 4:
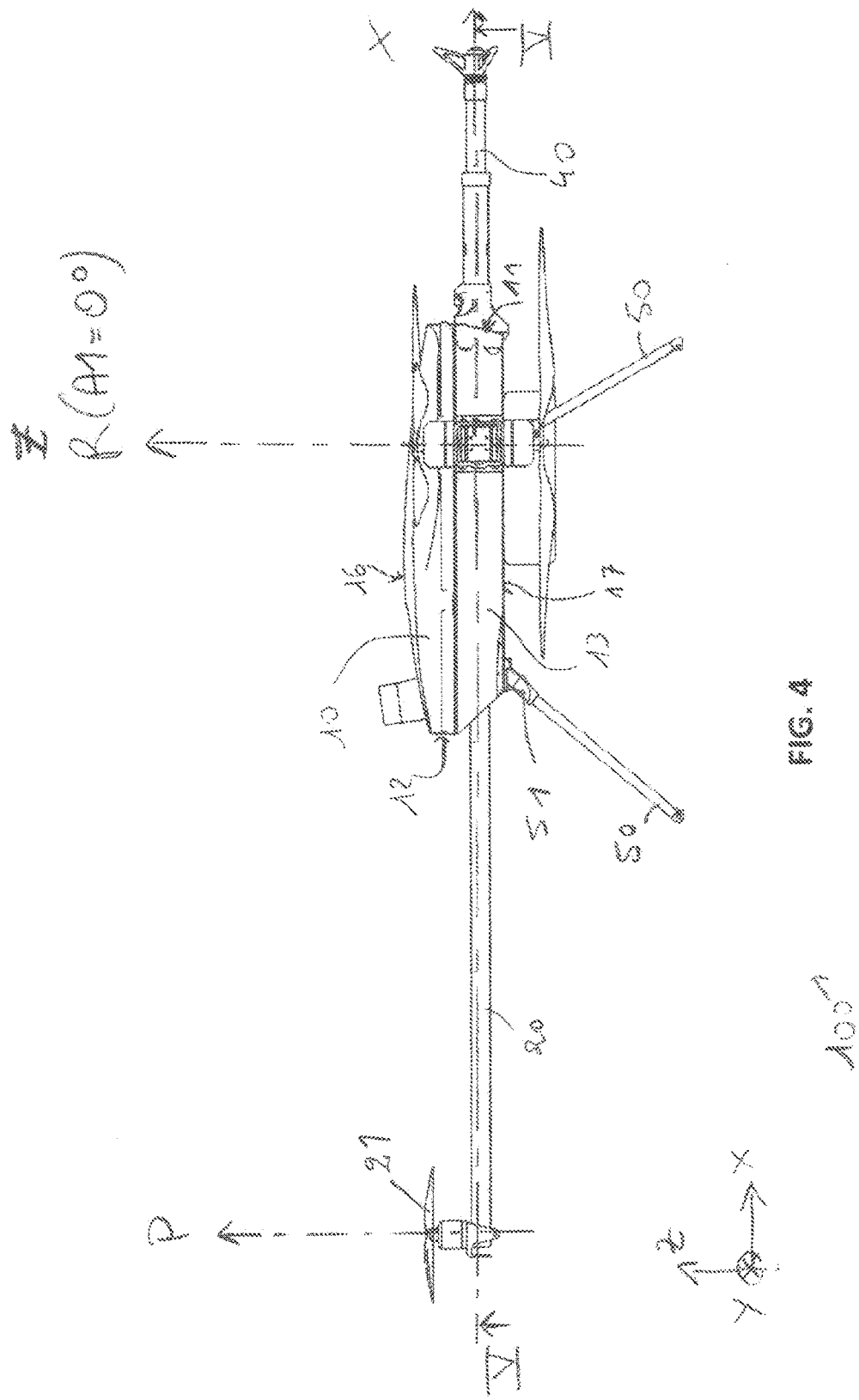
FIG. 4 shows a projection view of the aerial vehicle in the reference position of FIG. 1, from the right side, namely from ahead of the end part of the right arm.

The central frame 10 is a platform in the form of a flat box, elongated along and parallel to the first X axis, and parallel to the second axis Y. The central frame 10 contains on-board notably the electronical and control parts of the aerial vehicle 100. The central frame 10 defines a front face 11 for reversible attachment with equipment. The central frame 10 defines a rear face 12 from which extends a tail 20 equipped with a tail rotor 21. The central frame 10 also defines two lateral faces 13, 14 from each of which extends one arm 30 (as illustrated) or several arms (situation not shown). The central frame 10 also defines a top face 16 and a bottom face 17. Also, in a variant (not shown), the aerial vehicle 100 further comprises bumpers forming extension at the front part of the central frame 10

Figure 5:
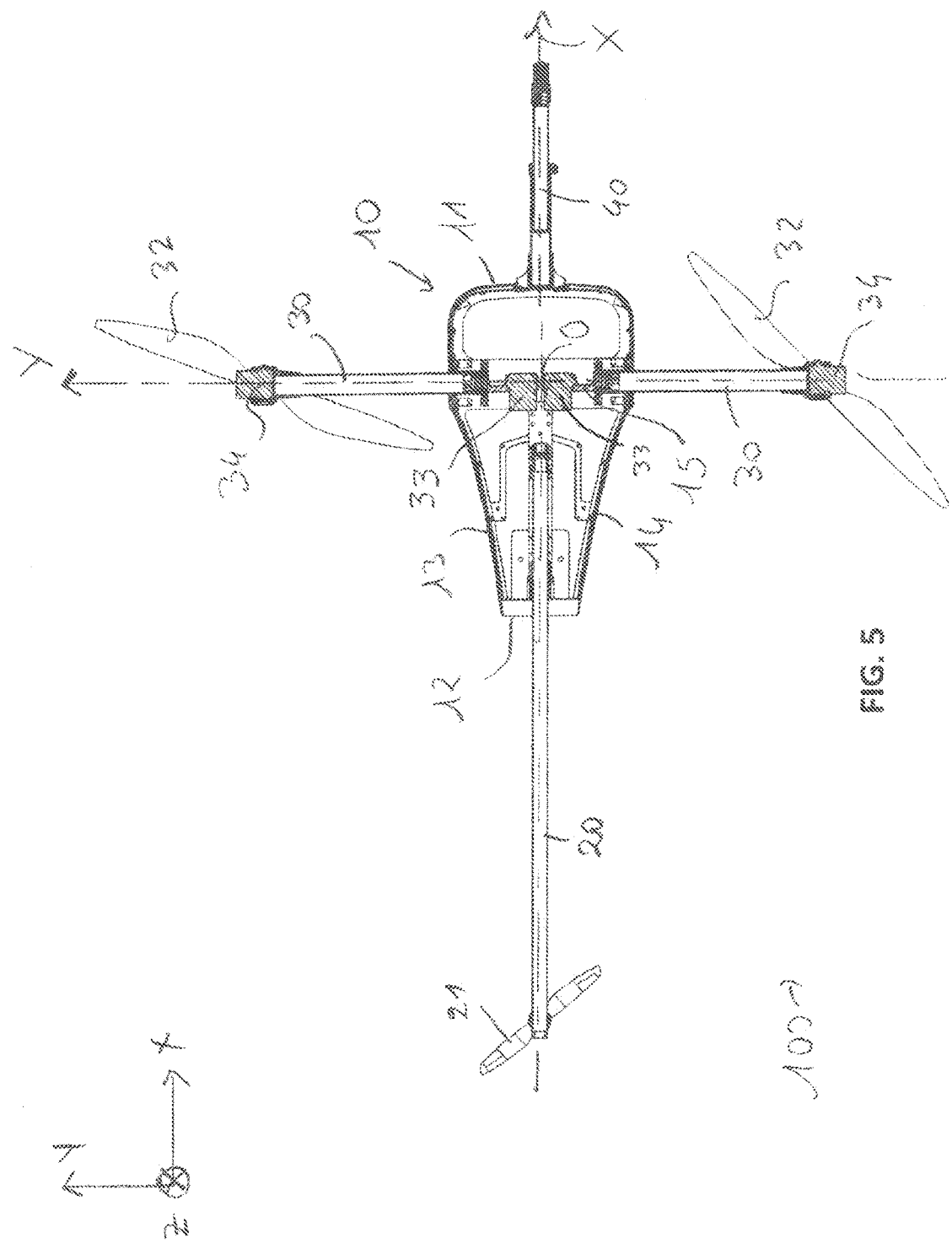
FIG. 5 shows a section view of the aerial vehicle in the reference position of FIG. 1, according to the horizontal plane X, Y, along the line V-V of FIG. 4, FIGS. 6 and 7 are similar views respectively of FIGS. 2 and 4 for the embodiment of the aerial vehicle of FIGS. 1 to 5, in another position with the arm rotation angle at 30° and the double rotor tilting angle at 0°.

Unlike classic aerial vehicles where the arms 30 are fixed with respect to the frame, according to the invention, the arms are able to tilt or to rotate around at least one axis, which is named the second axis in the present text. Also, the angular position of the arm 30 around this second axis, with respect to the third axis Z, defines an arm rotation angle (A1) (see FIG. 1). In the illustrated embodiment, this second axis is coaxial with the arm's direction (Y axis) to that the orientation of the arms 30 with respect to the central frame 10 is fixed. The arm rotation angle Al is controlled by a first actuator 33. In FIG. 5, this actuator 33 is visible within the central frame 10.

Figure 6:
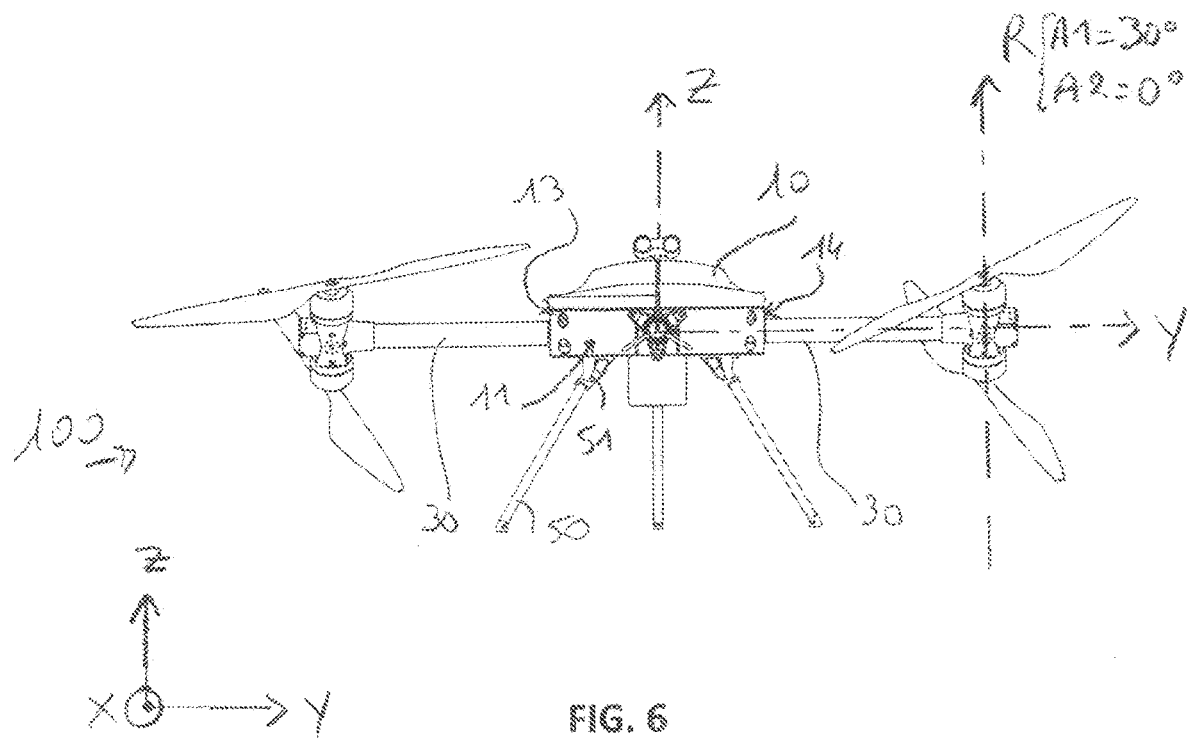
Figure 8:
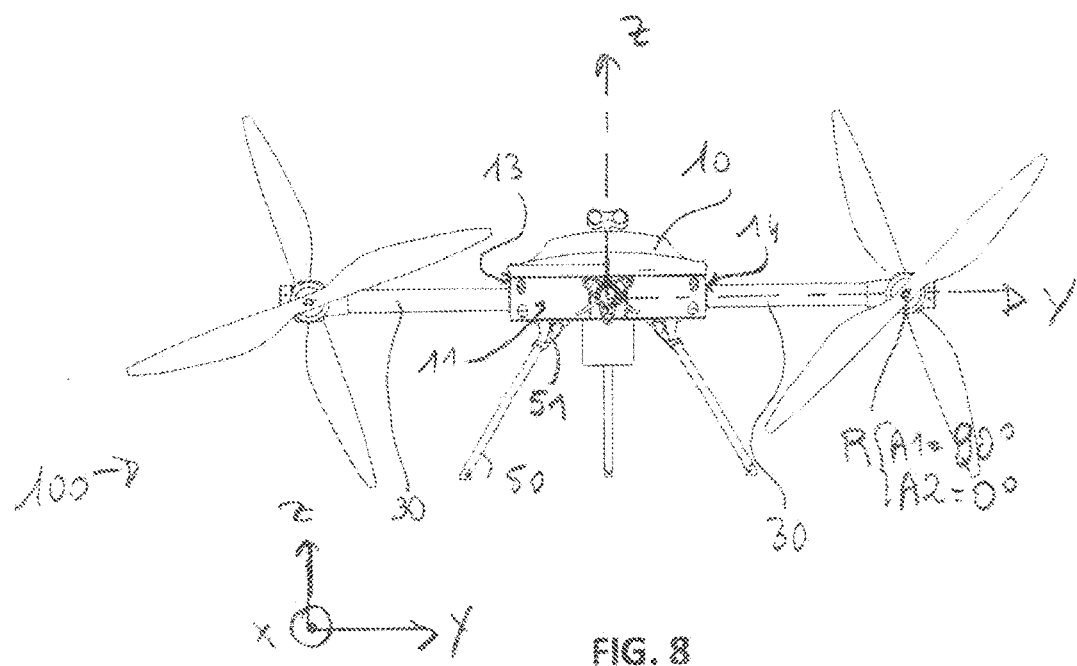
FIGS. 8 and 9 are similar views respectively of FIGS. 2 and 4 for the embodiment of the aerial vehicle of FIGS. 1 to 5, in another position with the arm rotation angle at 90° and the double rotor tilting angle at 0°.
Figure 7:
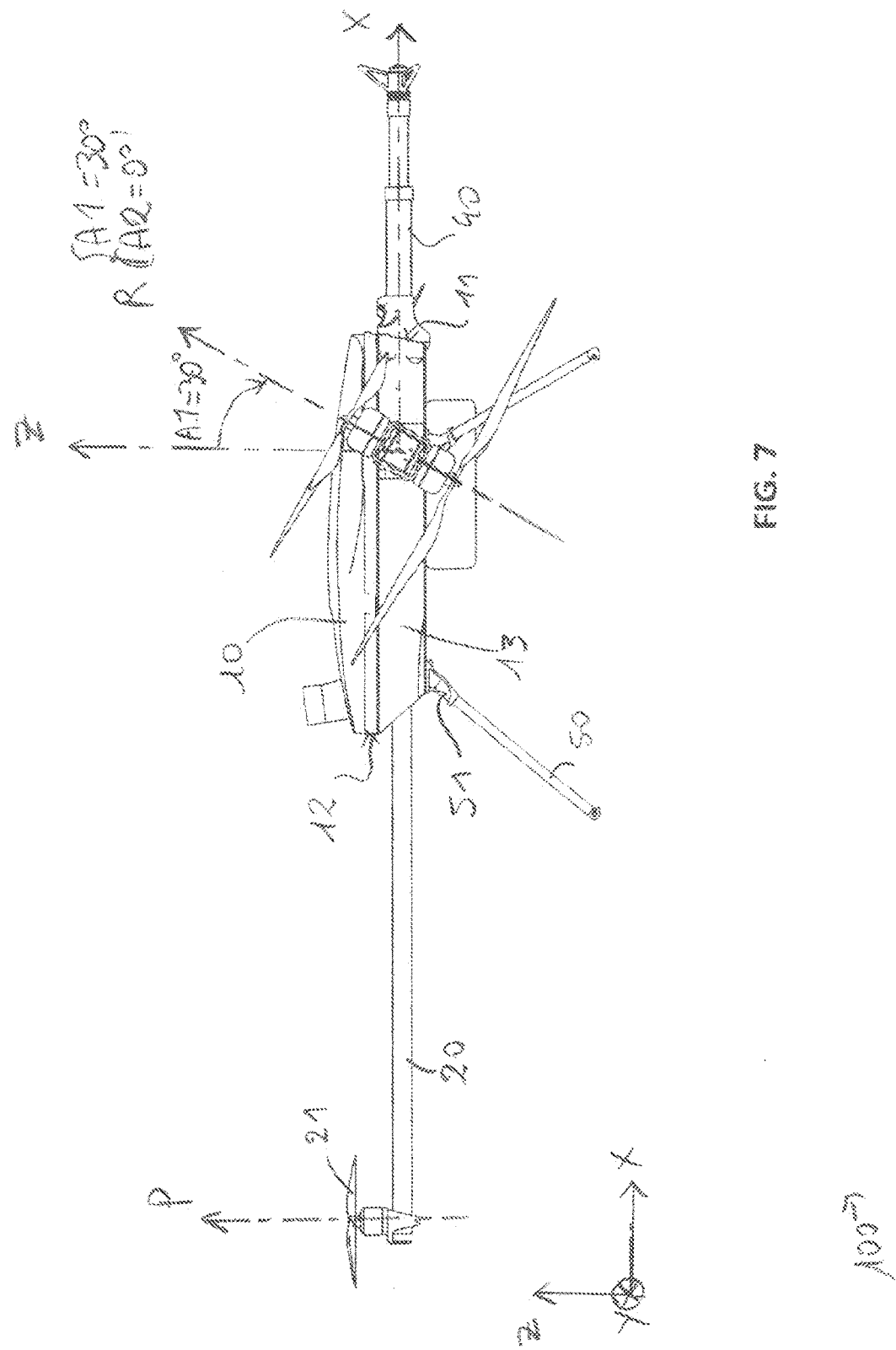
Figure 9:
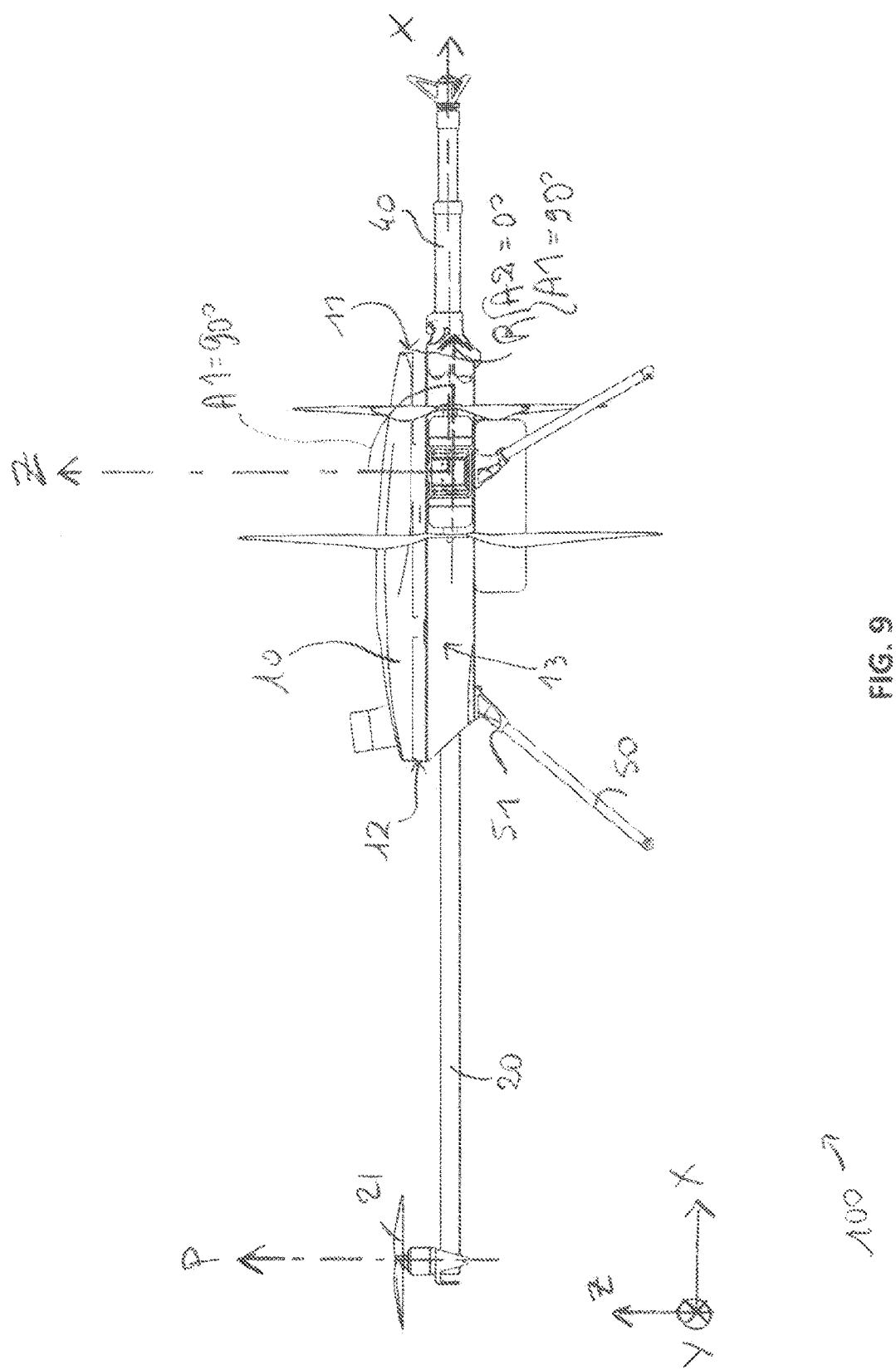

In FIGS. 1 to 5, this arm rotation angle A1 is 0°; in FIGS. 6 and 7, this arm rotation angle A1 is +30°; in FIGS. 8 and 9, this arm rotation angle A1 is +90°.

Preferably, said arm rotation angle A1 is contained within the range −180° to +180° so as to take any angular position around the second axis. In a possible embodiment, said arm rotation angle A1 can take any angular value in the 0° to 360° range, with a possible continuous rotation by using a slip ring that avoids the cable twisting.

Also, each arm 30 is equipped with two thrust motors 31 controlling the spinning in opposite direction of two coaxial rotors 32. In the illustrated embodiment, the free end of each arm 30 is equipped with said two thrust motors 31. In another possible arrangement, not shown, the two double rotors 32 are located at the end portion of the arm 30, which can be distant of the free end of said two arms 30. These thrust motors 31 allows the spinning of the double rotors 32 to generate lift force for the aerial vehicle 100.

Therefore, according to the invention, when considering each one of the two arms 30, his two rotors 32 (top rotor and bottom rotor of the same arm 30) are spinning in opposite directions.

Figure 10:
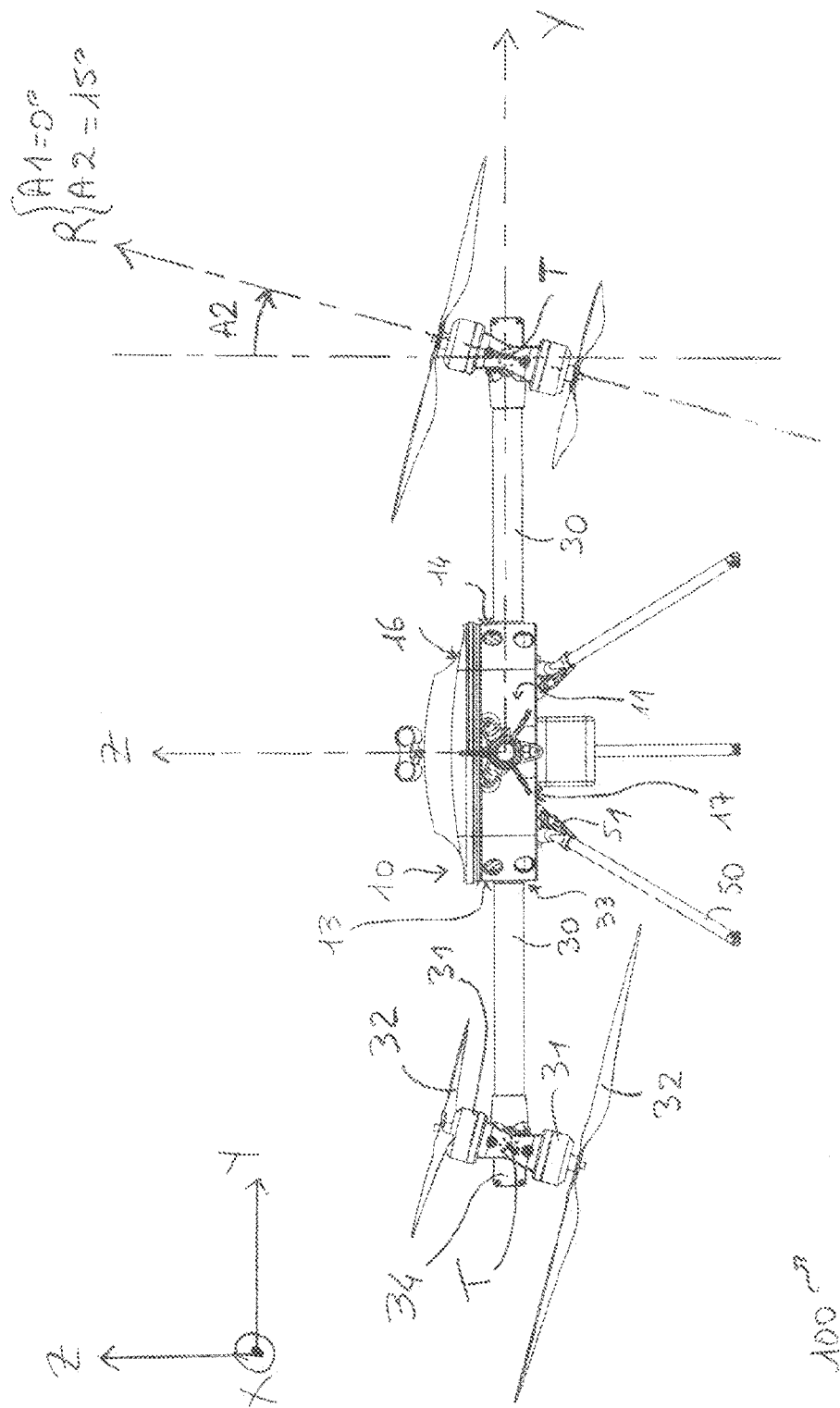
FIG. 10 is a similar view as FIG. 2 for the embodiment of the aerial vehicle of FIGS. 1 to 5, in another position with the arm rotation angle at 0° and the double rotor tilting angle at 15°.

Also, the two coaxial rotors 32 define a double rotor axis R. The thrust motors 31 rotate around this double rotor axis R, in opposite directions, which also make the two coaxial rotors 32 rotate around this double rotor axis R, in opposite directions. For each pair of rotors 32, the the respective angular position of the rotors 32 is not determined, and not defined (can be any relative rotate around this double rotor axis R, in opposite directions). The two coaxial rotors 32 can tilt together with respect to another tilting axis T (see FIG. 1). Said tilting axis T is perpendicular to the second axis (Y axis). The angular position of the double rotor 32 or double rotor axis R with respect to the plane orthogonal to the second axis, is defining a double rotor tilting angle A2. In the illustrated embodiment, this second axis is coaxial with the arm's direction (Y axis) so that the double rotor tilting angle A2 is measured with respect to the plane (Z, T). In FIGS. 1 to 9, this double rotor tilting angle A2 is 0°; in FIG. 10, this double rotor tilting angle A2 is +15° for both double rotors 32 which double rotor tilting angle A2 are parallel. In other words, the two double rotors 32 tilt together the same amount with respect to the third axis Z, or more precisely with respect to a plane parallel to the third axis Z and secant with the tilting axis T.

Preferably, said double rotor tilting angle (A2) is contained within the range −25° to +25°. In a possible embodiment, said double rotor tilting angle (A2) is contained within the range −15° to +15°. The arm double rotor tilting angle A2 is controlled by a second actuator 34. In FIGS. 1 and 5, this second actuator 34 is visible at the tip of the arm 30.

This way, changing the generated force direction or thrust vectoring, which provides omni-directionality, is possible notably through the tilting (rotation) of the arms 30 around at least one axis, named the second axis in the present text (Y axis in the figure), with respect to the central frame 10.

In the illustrated embodiment, said second axis (Y) is coaxial with the corresponding arm 30.

In the illustrated embodiment, the aerial vehicle 100 comprises two coaxial arms 30, extending from opposite faces (two lateral faces 13 and 14) of said central frame, along said second axis (Y). Therefore, these two arms 30 are parallel and coaxial to each other.

In some other embodiments (not shown), the aerial vehicle 100 comprises more than two coaxial arms, namely four, six or eight arms, extending symmetrically from opposite faces of said central frame.

The tail 20 extends along the first axis X from the rear of the central frame 10, according to a relative long dimension, for instance 80 cm from the central point O. This long tail provides a good lever arm which is efficient for rapidly change the orientation of the aerial vehicle 100, namely to change the pitch angle of the central frame 10, notably when the rotor is decelerating or inversely accelerating. The tail 21 is equipped with a tail rotor 21 spinning around a tail rotor axis P, said tail rotor axis P being parallel to a third axis Z.

In a preferred embodiment, the direction of rotation of the tail rotor 21 can be inverted.

In that respect, the profile of the two airfoils of the tail rotor 21 is double symmetric, meaning symmetric with two planes of symmetry, a first plane of symmetry between the leading edge and the trailing edge of the foil, and a second plane of symmetry being the chord line. Such a geometry leads to a continuous identical section of the tail rotor 21 along the length of the foils: the upper camber being the same than the lower camber along the length of the two foils of the tail rotor 21, and the leading edge and the trailing edge having the same shape along the length of the two foils of the tail rotor. Thus, the tail rotor 21 has the same dynamics independent of the direction of rotation. In that configuration, the tail rotor 21 is in one piece, the two airfoils being not movable one with respect to the other.

In the illustrated embodiment, said arms 30 and said tail 20 define a main plane (X, Y) for said aerial vehicle 100, said central frame 10 being secant with said main plane (X, Y). Said main plane (X, Y) is also defined by the first axis (X) and the second axis (Y) which are orthogonal to each other. Also, these first axis (X) and the second axis (Y) are secant to a central point (O) which is contained within the central frame 10. A third axis Z defines with the first axis (X) and the second axis (Y) an orthogonal geometrical system (see FIG. 1). Said first axis (X), said second axis (y) and said third axis (Z) are therefore secant into said central point (O).

The control of the change of rotation direction for the tail rotor 21 with a double symmetric shape of the two airfoils of the tail rotor 21 provides in an efficient way the inversion of the lift direction for the aerial vehicle 100.

The decoupling of attitude and position makes it possible to control the position of any equipment mounted on the central frame 10 very precisely.

As can be seen in FIG. 5, a clutch element 15 having a tube shape with a lateral opening at of its end for cable passage, connects the actuator 33 and the arm 30. As a possible embodiment, this clutch element 15 is designed (shape and material) so as to provide a relative mechanical flexibility: in that situation, the mechanical stress applied in the arm 30 is not transmitted to the actuator 33, except for the one rotation around the arm axis which is controlled by the actuator 33. In case of impact on the arm 30, such a flexible clutch element 15 prevents some serious damage of the arm 30, or at least of the actuator 33 while also making the rotation of the arm 30 possible. Such a clutch element 15 also compensates for small misalignment between actuator 33 axis and arm 30 axis. In that respect, the clutch element 15 can tolerate a radial, axial and angular misalignment between the actuator and the arm 30 but is relative stiff in torsion, which is important for precise control.

Figure 11:
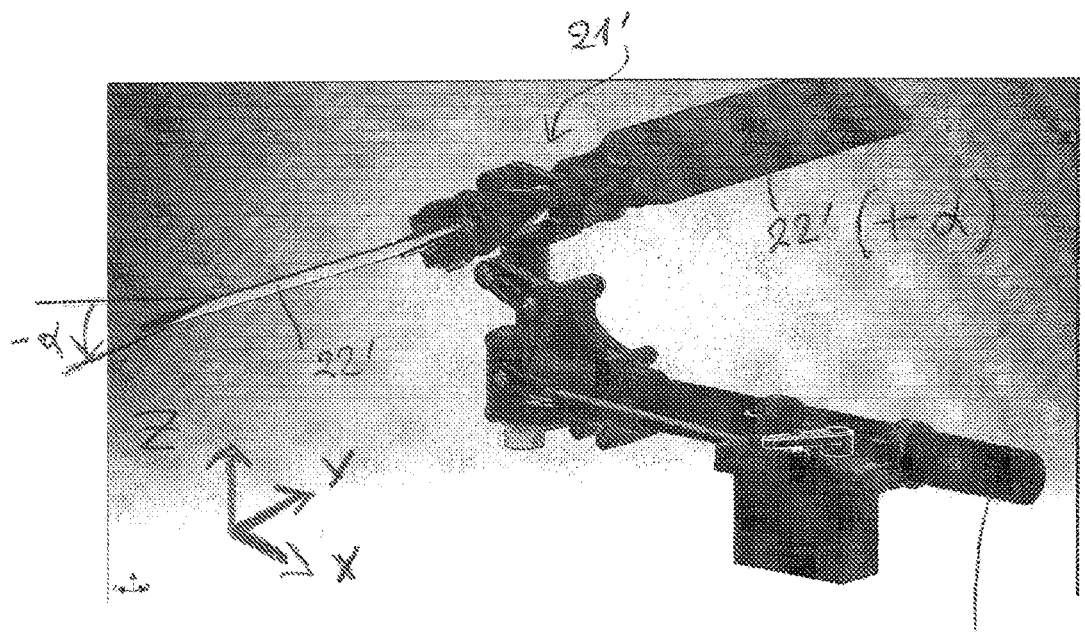
FIGS. 11 and 12 are perspective views of the tail rotor in two different positions, for a variant implementation of the tail rotor.
Figure 12:
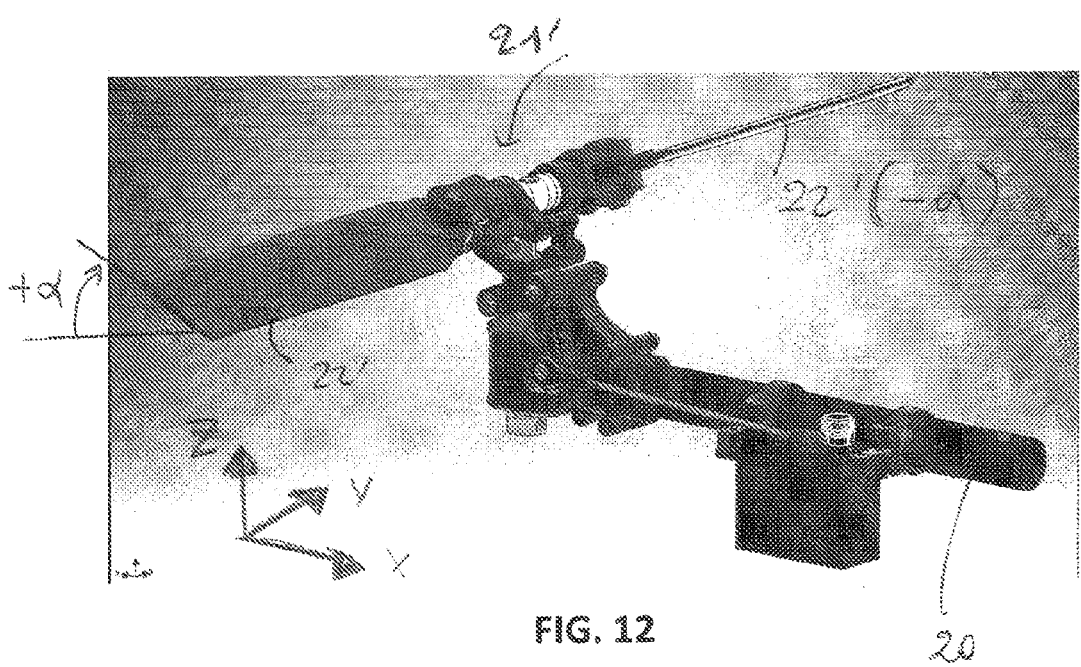

In a variant implementation for the tail rotor 21', which is shown on FIGS. 11 and 12, the two airfoils or blades 22' of the tail rotor 21' have opposite inclination, which means opposite angle of attack and are moveable with respect to each other. Among the possible positions for the orientation of the two blades 22' which have a continuous motion, can be defined the following extreme or remarkable positions:
- in a neutral angular position (not shown), the two blades 22' have an horizontal orientation (angle of attack)=0° and are parallel to each other;
- in a first extreme position visible on FIG. 11, a first one of the two blades (right side of the FIG. 11) is orientated with an angle +α with respect to the horizontal plane (X, Y) and the second one of the two blades (left side of the FIG. 11) is orientated with an angle −α with respect to the horizontal plane (X, Y); and
- in a second extreme position visible on FIG. 12, the first one of the two blades 22' (right side of the FIG. 12) is orientated with an angle −α with respect to the horizontal plane (X, Y) and the second one of the two blades (left side of the FIG. 12) is orientated with an angle +α with respect to the horizontal plane (X, Y). Also, in that variant implementation of the tail rotor 21, there is one unique direction of rotation for the tail rotor 21. In that situation, the change of orientation of the blades 22', provides the inversion of the lift direction for the aerial vehicle 100.

An elongated member 40 is visible on the FIGS. 1 to 10, at the front face 11 of the central frame. In this illustrated embodiment, the elongated member 40 is telescopic and can receive some piece of equipment through its end fixing part. Preferably, this elongated member 40 is compliant.

In another embodiment, not shown, the front face 11 of the central frame 10 has no elongated member but the central frame 10 is directly equipped with supporting means for removably attaching an equipment.

A lot of possible equipment can be mounted onto the front face 11 of the central frame 10. Among the possibilities, the following pieces of equipment can be, taken alone or in combination, as follows: manipulator, sensor, nozzle, etc. As non-limiting examples of manipulator, there are gripper, spray nozzle, driller, etc. As non-limiting examples of sensor, there are profometer (see below), Eddy current profometer, ultrasonic thickness measurement gauge, ground penetration radar, potential field mapping sensor, camera, thermal camera, etc.

Within the central frame, among other things, there are the following pieces of gear, forming on-board sensors:
- in all cases, an Inertial Measurement Unit IMU: this electronic device measures and reports a body's specific force, angular rate, and the magnetic field surroundings the body, using a combination of accelerometers, gyroscopes, and magnetometers;
- preferably, a Laser scanner (such as a 3D LiDar), namely a sensor that combines controlled steering of laser beams with a laser rangefinder. By taking a distance measurement at every direction the scanner rapidly captures the surface shape of the environment, buildings and structures. The sensor is used to create 3D map of the surrounding environment with a good accuracy (±3 cm error);
- preferably, Cameras: Up to 10 cameras can be installed on the drone to create a 360 degree field of view coverage;
- preferably, a GNSS (Global Navigation Satellite System): An electronic device forming a GPS system that uses satellites to provide autonomous geo-spatial positioning. It allows small electronic receivers to determine their location (longitude, latitude, and altitude/elevation) to high precision (within a few metres) using time signals transmitted along a line of sight by radio from satellites; and
- (in some case) a barometer, namely an electronic device that measures the air pressure, in order to help controlling the altitude (the height) of the aerial vehicle 100.

The aerial vehicle 100 can be powered with a battery or from power coming over a tether.

The sensor data can be synchronized in time, namely taking the measure at the same moment(s), which allows to collect the date in a more accurate way. In another data collection mode, the sensor data can also be measured and collected at different moments between them but with accurate known timing with respect to a "wall clock". Data from these sensors are fused using sensor fusion algorithms running on the onboard computer. The onboard computer placed also within the central frame generate actuators command signals to control the drone behavior.

Preferably, as visible on FIG. 1, when the aerial vehicle 100 has no equipment, the center of mass C0 of the aerial vehicle 100 is placed within the central frame 10, and on particular within the half portion of the central frame 10 which is the closest to the tail 20 (Rear half portion H1 of the central frame).

Also, when the aerial vehicle 100 has an equipment (shown on FIG. 1 with zone E), the center of mass C1 is placed preferably within the central frame 10 or in front of the central frame 10, and in particular within the half portion H2 (shown on FIG. 1) of the central frame 10 which contains the front face 11 of the central frame 10 (Front half portion H2 of the central frame).

For instance the equipment is attached to the central frame 10 through supporting means that can removeably attach the equipment to the central frame 10. On FIGS. 1 to 10, this supporting means is the telescopic elongated member 40. On FIG. 1, the equipment is represented only by a identified zone E at the tip of the elongated member 40.

Also, preferably, as visible on FIG. 1, the distance between the tail rotor 21 up to the front face 11 of the central frame (Length L) is larger than or equal to the distance between the two double rotors 32 (width W). This general geometrical relation provides a long tail 20 with respect of the size of the aerial vehicle 100, which gives rise to an efficient lever arm effect for the tail when changing the pitch by inverting the rotation direction of the tail rotor 21. In a possible embodiment, the length L is about 80 cm. the width W is about 70 cm, while using a tail rotor of about 20 cm and main propellers of the double rotors 32 of the arms 30 of about 40 cm. In other possible configurations, not shown, the distance between the tail rotor 21 up to the front face 11 of the central frame 10 (Length L) is larger than or equal to the distance between the two double rotors 32 (width W).

In some embodiments, including the embodiment shown in FIGS. 1 to 12, the aerial vehicle 100 comprises only one tail 20 extending from the central frame 10, this sole tail 20 being equipped with the only and sole tail rotor 21. Also, such an aerial vehicle 100 comprises only and exactly two arms 30, the latter being each able to tilt or to rotate with respect to the central frame 10, being aligned and being each equipped with said two rotors. Consequently, in this configuration the aerial vehicle 100 forms a aerial vehicle having a general T-shape, where the leg of the T is formed by the tail and the two branches of the upper part of the T are formed by the two arms 30. It means that the tail 20 is orthogonal to the two arms 30. Also, in this configuration, according to a possible variant corresponding to the aerial vehicle 100 shown in FIGS. 1 to 12, the tail 20 and the two arms 30 are coplanar.

As an example of possible application of the aerial vehicle 100 of the invention, is now presented the non-destructive inspection of the reinforcement bars embedded in concrete. For such analysis, a profometer is mounted at the front face of the central frame as the only one element of equipment or one of the pieces of equipment of the aerial vehicle 100. Such a profometer is an instrument for detecting location, size of reinforcement in concrete cover also with thickness of concrete cover. This instrument is also known as rebar locator or a cover meter This is a small, versatile, portable and handy instrument which is normally used to locate the reinforcement via a display, notably an LCD display. In that case, the guiding or controlled navigation, including a possible predefined route, of the aerial vehicle 100 allows to have a contact point between the profometer and the surface of the structure to be controlled. This contact point (with or without application of a force applied by the profometer onto the surface) is moreover maintained while moving the aerial vehicle 100 and/or for each contact points formed by inspection predefined points where the control and/or measurement is to be implemented.

More generally, inspection of infrastructure, which is a continuous process, can be facilitated with the use of such an aerial vehicle 100. Moreover, sometimes, visual inspection isn't enough and an in-depth inspection is required where sensor placement on the structure is needed. In some situation, an internal structure of the pipe needs to be checked using scaffoldings, having people hanging on ropes or using cranes, which is risky and expensive. With the solution of the present invention, are provided omnidirectional drones that can interact with the environment. In an embodiment, the aerial vehicle 100 is equipped with a manipulator and can extend its front elongated member, place a sensor in front of or against (in contact with) the wall and get the measurements needed from the sensor and thus be helpful for inspection tasks. In that application of the aerial vehicle 100, this will help do away with temporary structure of scaffolding and having workers hanging on from ropes or using cranes.

As another example of possible application of the aerial vehicle 100 of the invention, for painting surfaces including drawing patterns on both planar and 3D surfaces. In that example, not shown on the drawing, an arm (or an elongated element) plus a spray nozzle are mounted at the front face 11 of the central frame 10 as elements of equipment of the aerial vehicle 100. In one embodiment, the spray nozzle is connected to a first end of a pipe which other end is mounted on a paint reservoir equipped with an air compressor, so that compressed air pushes the paint along a pipe. Also, a valve is mounted next to the nozzle on the pipe to control the flow of paint. Furthermore, through a system of valves and pipes, mixing multiple colors is possible.

With such an equipment, the aerial vehicle 100 according to the present invention is capable of painting surfaces and can draw patterns on both planar and 3D surfaces.

According to some embodiments, the aerial vehicle 100 interact with a surface while flying with the central frame 10 being orientated with any orientation, namely vertically, or being orientated horizontally, or being inclined (orientation of the plane (X, Y) between horizontal and vertical orientation.

According to some embodiments, the aerial vehicle 100 can fly 90 degrees vertically and tilt horizontal, and do also upside down flights. Such features are coming to the market for the first time. The ability to interact with the environment in unique According to some embodiments, the aerial vehicle 100 can correct disturbance, be in a stable position and apply force on the environment. Also, the aerial vehicle 100 can have compliance to handle collisions and impacts According to an embodiment, the aerial vehicle 100 further comprises at least three legs 50 allowing for support of the aerial vehicle 100 on any support such as the floor, said legs 50 forming in particular a tripod or a three-legged stand. In the embodiment shown in the figures (see FIGS. 1 to 4 and 6 to 9), three legs 50 are mounted to the central frame 10, from the bottom face 17, with a compliant (flexible) mount 51, so as to be able to absorb harsh landings.

According to some embodiments of the invention, is therefore provided an aerial vehicle 100 that is capable of omnidirectional flight and that carries a manipulator which can exert forces and torques in all directions, including a compliant manipulator or even a passively compliant manipulator.

In some embodiments, the aerial vehicle 100 can furthermore continuously maintain a target within the sensor field of view or can follow a complex structure.

With an aerial vehicle 100 according to some embodiments of the invention, this improves the possibilities of control and planning for aerial robots and therefore elevates the versatility and relevance of aerial robots to many industrial and scientific applications.

In some cases of the prior art aerial vehicle, the presence of internal forces within the aerial vehicle reduces the efficiency of the aerial vehicle as a whole system. With an aerial vehicle 100 according to some embodiments of the invention, the configuration reduces or even deletes internal forces within the aerial vehicle.

One or several of the following flight mode is (are) possible with the aerial vehicle 100 according to the invention:

Manual mode: The most basic flight mode of the system is manual control by a pilot. 3D force command, heading angle and pitch tilting angles are transmitted using radio controller by a pilot.

Fixed distance to wall: In this flight mode, fixed distance to wall can be maintained while a pilot commands lateral and vertical translation along the wall. Onboard sensors are used to measure distance to wall and onboard computer algorithm generate actuator command signal to maintain the distance to wall.

Autonomous mode: In this mode, the drone using onboard and/or offboard sensors and computers can execute a predefined mission navigating in the environment and avoiding obstacles. Example of missions can be: inspection of predefined points or spray painting a desired figure or pattern.

LIST OF REFERENCE SIGNS USED IN THE FIGURES

X First axis
Y Second axis
Z Third axis
R Double rotor axis
T Tilting axis
P Tail rotor axis
A1 Arm rotation angle
A2 Double rotor tilting angle
O Central point
W Width of the aerial vehicle
L Length of the aerial vehicle
E Zone for equipment
H1 Rear half portion of the central frame
H2 Front half portion of the central frame
C0 Center of mass of the aerial vehicle without equipment
C1 Center of mass of the aerial vehicle with equipment
100 Aerial vehicle
10 Central frame
11 Front face
12 rear face
13 Lateral face
14 Lateral face
15 Clutch element
16 Top face
17 Bottom face
20 Tail
21 Tail rotor
21' Tail rotor (alternative)
22' Symmetric blade
α Orientation angle of the blade
30 Arm
31 Thrust motor
32 Rotor
33 First actuator
34 Second actuator
40 Elongated member
50 Leg
51 Compliant mount

What is claimed is:

1. An aerial vehicle comprising:
a central frame;
a tail extending from the central frame along a first axis (X); and
at least two arms extending from the central frame and able to rotate around at least one second axis (Y), thereby defining an angular position of the arm with respect to the second axis (Y), said angular position of the arm with respect to the second axis (Y) defining an arm rotation angle (A1),
wherein said tail is equipped with a sole tail rotor spinning around a tail rotor axis (P),
wherein said tail rotor axis (P) is parallel to a third (Z) axis which is orthogonal to both the first axis (X) and the second axis (Y), wherein said tail rotor has the ability to invert its direction of rotation, with a first direction of rotation and a second direction of rotation, said second direction of rotation being inverted with respect to the first direction of rotation, wherein said tail rotor has two symmetric airfoils, said two airfoils having a double symmetric profile, with a first plane of symmetry between the leading edge and the trailing edge of the foil, and a second plane of symmetry along the chord line, wherein each arm is equipped with two thrust motors controlling two coaxial rotors, said two coaxial rotors being able to have a spinning motion, wherein said two thrust motors are able to control the spinning motion of said two coaxial rotors in opposite directions, wherein the two coaxial rotors define a double rotor axis (R) and can tilt together with respect to a tilting axis (T), said tilting axis (T) being perpendicular to the second axis (Y), the angular position of the double rotor with respect to the double rotor axis (R) defining a double rotor tilting angle (A2), and wherein said two coaxial rotors are located equidistant from either side of said tilting axis (T).

2. The aerial vehicle according to claim 1, wherein said second axis (Y) is coaxial with said arm.

3. The aerial vehicle according to claim 1, wherein said arms and said tail define a main plane (X, Y) for said aerial vehicle, said central frame being secant with said main plane (X, Y).

4. The aerial vehicle according to claims 1, wherein said first axis (X), said second axis (y) and said third axis (Z) are secant into a central point (O).

5. The aerial vehicle according to claim 4, wherein said central point (O) is contained within the central frame.

6. The aerial vehicle according to claim 1, wherein said arms are two coaxial arms, extending from opposite faces of said central frame, along said second axis (Y).

7. The aerial vehicle according to claim 1, wherein said double rotor tilting angle (A2) is contained within the range −25° to +25°.

8. The aerial vehicle according to claim 1, wherein said arm rotation angle (A1) can take any value within the range −180° to +180° with respect to the third axis (Z).

9. The aerial vehicle according to claim 1, wherein the tail rotor has two symmetric airfoils and wherein the airfoils of the tail rotor have opposite inclination.

10. The aerial vehicle according to claim 1, wherein a front face of the central frame is equipped with supporting means for removably attaching an equipment.

11. The aerial vehicle according to claim 10, wherein said equipment comprises at least one of the following: manipulator, sensor, or nozzle.

12. The aerial vehicle according to claim 10, wherein said supporting means comprises a compliant elongated member, said elongated member having an end fixing part for removably attaching said equipment.

13. The aerial vehicle according to claim 1, wherein the central frame has a first half portion which is the closest to the tail and a second half portion which contains a front face of the central frame, wherein the center of mass (C0) of the aerial vehicle is placed within the central frame, within the first half portion (H1) of the central frame.

14. The aerial vehicle according to claim 1, wherein said central frame has a front face, wherein the aerial vehicle further comprises an equipment mounted onto the front face of the central frame and wherein the center of mass (C1), of the aerial vehicle with the equipment, is placed within the central frame or in front of the central frame.

15. The aerial vehicle according to claim 14, wherein the central frame has a first half portion which is the closest to the tail and a second half portion which contains the front face of the central frame, wherein the center of mass (C1), of the aerial vehicle with the equipment, is placed within the second half portion (H2) of the central frame which contains the front face of the central frame.

16. The aerial vehicle according to claim 1, wherein said central frame has a front face, and wherein the distance (L) between the tail rotor up to the front face of the central frame is larger than or equal to the distance (W) between the two rotors.

17. The aerial vehicle according to claim 1, wherein the two rotors are located at the end portion of said two arms.

18. The aerial vehicle according to claim 1, wherein the central frame has a front part, and wherein said aerial vehicle further comprises bumpers which form an extension at the front part of the central frame.

19. The aerial vehicle according to claim 1, further comprising at least three legs allowing for support of the aerial vehicle on any support or on a floor.

20. The aerial vehicle according to claim 19, wherein said legs form a tripod or a three-legged stand.

21. The aerial vehicle according to claim 1, wherein said tail rotor has two airfoils with a trailing edge, a leading edge and a chord line, each of said airfoils being symmetric with respect to a first plane of symmetry between the leading edge and the trailing edge of the foil, and with respect to a second plane of symmetry along the chord line, forming airfoils with a continuous identical section along their length.

22. The aerial vehicle according to claim 1, wherein said double rotor tilting angle (A2) being the same, having the same direction and having the same magnitude, for the double rotor of each arm.

23. An aerial vehicle comprising:
a central frame;
a tail extending from the central frame along a first axis (X); and
at least two arms extending from the central frame and able to rotate around at least one second axis (Y), thereby defining an angular position of the arm with respect to the second axis (Y), said angular position of the arm with respect to the second axis (Y) defining an arm rotation angle (A1),
wherein said tail is equipped with a sole tail rotor spinning around a tail rotor axis (P),
wherein said tail rotor axis (P) is parallel to a third (Z) axis which is orthogonal to both the first axis (X) and the second axis (Y),
wherein the tail rotor has two symmetric airfoils defining an angle of attack, wherein the airfoils of the tail rotor have opposite inclination in relation with their angle of attack,
wherein the orientation of said two airfoils is variable, said two airfoils having opposite variable angles of attack,
wherein the direction of rotation of the tail rotor is not inverted, and
wherein each arm is equipped with two thrust motors controlling two coaxial rotors, said two coaxial rotors being able to have a spinning motion, wherein said two thrust motors are able to control the spinning motion of said two coaxial rotors in opposite directions,
wherein the two coaxial rotors define a double rotor axis (R) and can tilt together with respect to a tilting axis (T), said tilting axis (T) being perpendicular to the second axis (Y), the angular position of the double rotor with respect to the double rotor axis (R) defining a double rotor tilting angle (A2), said double rotor tilting angle (A2) being the same, having the same direction and having the same magnitude, for the double rotor of each arm, and wherein said two coaxial rotors are located equidistant from either side of said tilting axis (T).

24. An aerial vehicle comprising:

a central frame;

a tail extending from the central frame along a first axis (X); and at least two arms extending from the central frame and able to rotate around at least one second axis (Y), thereby defining an angular position of the arm with respect to the second axis (Y), said angular position of the arm with respect to the second axis (Y) defining an arm rotation angle (A1), wherein said tail is equipped with a sole tail rotor spinning around a tail rotor axis (P), wherein said tail rotor axis (P) is parallel to a third (Z) axis which is orthogonal to both the first axis (X) and the second axis (Y), wherein each arm is equipped with two thrust motors controlling two coaxial rotors, said two coaxial rotors being able to have a spinning motion, wherein said two thrust motors are able to control the spinning motion of said two coaxial rotors in opposite directions, wherein the two coaxial rotors define a double rotor axis (R) and can tilt together with respect to a tilting axis (T), said tilting axis (T) being perpendicular to the second axis (Y), the angular position of the double rotor with respect to the double rotor axis (R) defining a double rotor tilting angle (A2), said double rotor tilting angle (A2) having the same orientation direction for the double rotor of each arm, and wherein said two coaxial rotors are located equidistant from either side of said tilting axis (T).

\* \* \* \* \*